United States Patent [19]

Giusto

[11] 4,376,306

[45] Mar. 8, 1983

[54] FRAME-SYNCHRONIZING METHOD AND SYSTEM FOR RECOVERING SUPPLEMENTAL INFORMATION FROM SUPERMODULATED STREAM OF MULTILEVEL SYMBOLS

[75] Inventor: Pietro P. Giusto, Turin, Italy

[73] Assignee: CSELT Centro Studi e Laboratori Telecomunicazioni S.p.A., Turin, Italy

[21] Appl. No.: 250,706

[22] Filed: Apr. 3, 1981

[30] Foreign Application Priority Data

Apr. 4, 1980 [IT] Italy .............................. 67530 A/80

[51] Int. Cl.³ .............................................. H04J 7/00
[52] U.S. Cl. .................................. 370/110.4; 370/100
[58] Field of Search ..................... 370/110.4, 112, 100, 370/118, 108, 11; 375/118

[56] References Cited

U.S. PATENT DOCUMENTS

| | | | |
|---|---|---|---|
| 3,612,770 | 10/1971 | Zegers | 370/110.4 |
| 3,883,729 | 5/1975 | de Cremiers | 370/100 |
| 4,131,761 | 12/1978 | Giusto | 370/110.4 |
| 4,243,930 | 1/1981 | DeCoursey | 370/110.4 |

Primary Examiner—Douglas W. Olms
Attorney, Agent, or Firm—Karl F. Ross

[57] ABSTRACT

A stream of digital symbols with three or more distinct amplitude levels, organized in a recurrent frame of N symbol periods, carries supplemental information in the form of a binary word of k bits per frame, with k substantially less than the probable minimum number of modulable waveforms, i.e. symbols of the lowest or the highest normal level. At a transmitting end of a signal path, the binary word is superimposed upon a group of k consecutive modulable waveforms at the beginning of each outgoing frame, with bits of logical value "1" indicated by a supermodulation of corresponding modulable waveforms to raise or lower their amplitudes to an extra-high or an extra-low level; the first and the last bit of this word have invariably the value "1". At a receiving end, a cyclic counter $CL_4$ stepped by extracted clock pulses establishes a recurrent incoming frame of normally N symbol periods while a dead-end counter $CC_2$ registers the first k modulable symbols of such frame and thus determines a recovery interval for the demodulation of their supplemental bits, followed by a redundancy interval in which no supermodulated waveforms are expected to occur in steady-state operation. A logic network PP counts the number of supermodulated waveforms detected in various sections of the redundancy interval and compares that number with the number of "1" bits carried by the first and $k^{th}$ modulable waveforms of the recovery interval; if this comparison reveals a disalignment between the outgoing and incoming frames, the logic network temporarily modifies the operating cycle of the cyclic counter to realign the two frames.

12 Claims, 7 Drawing Figures

FRAME-SYNCHRONIZING METHOD AND SYSTEM FOR RECOVERING SUPPLEMENTAL INFORMATION FROM SUPERMODULATED STREAM OF MULTILEVEL SYMBOLS

FIELD OF THE INVENTION

My present invention relates to signal transmission by the level-division-multiplexing (LDM) technique and more particularly to a method of and a system for recovering supplemental information from a supermodulated stream of multilevel symbols.

BACKGROUND OF THE INVENTION

In my prior U.S. Pat. No. 4,131,761, owned by the assignee of the present application, I have disclosed a method and a system of this type in which primary information is transmitted over a signal path in the form of a stream of symbols with three or more amplitude levels, i.e. two limiting (minimum and maximum) levels and one or more intermediate level. These symbols may be transmitted directly or via a carrier as amplitude-modulated pulses or, possibly, with intervening frequency modulation. Symbols with amplitudes on at least one limiting level are referred to as "modulable" since they can be used, in conformity with the teaching of my prior patent, for conveying the bits of a supplemental message word of a supervisory nature, for example; a bit of logical value "1" is characterized by an extension of the symbol amplitude beyond its normal limiting level to an extra-high or an extra-low level. These excursions beyond the normal amplitude range do not affect the recovery of the primary information from the symbol stream at a receiving end of the signal path since a threshold comparator used for this purpose will not distinguish between the maximum and the supermaximum (or the minimum and the subminimum) level.

Since modulable waveforms occur randomly in such a symbol stream it is necessary to correlate their demodulation for the recovery of the supplemental message at the receiving end with their supermodulation at the transmitting end. For this purpose it is convenient, as described in my prior patent, to organize the symbol stream at the transmitting end into a recurrent outgoing frame encompassing a fixed number of symbol periods, the number N of these symbol periods being large enough to insure that the probable number of modulable waveforms in each frame substantially exceeds the number k of bits in a binary word coding the supplemental information to be transmitted with each frame. The carriers for these bits are then the first k modulable waveforms occurring in a given outgoing frame; when the symbol stream arriving at the receiving end is similarly organized in a recurrent N-period incoming frame synchronized with the outgoing frame, these bits can be readily retrieved from the first k modulable waveforms of each incoming frame which may or may not be supermodulated.

The problem of synchronization is solved in the system of my prior patent by dividing each frame into a plurality of subframes and using the first subframe of each frame for the transmission of a multibit alignment word to the exclusion of supplemental message bits. The alignment word comprises an invariable first part with a characteristic bit combination and a variable second part which indicates the number of symbol periods or clock cycles elapsed between the beginning of the frame and the occurrence of the first modulable waveform therein; that information enables a decoder at the receiving end to determine the starting points of the remaining subframes for a correct decoding of their respective supplemental messages.

While the LDM system of my prior patent operates generally satisfactorily, the need for using an alignment word reduces the number of supplemental message bits that can be transmitted in each frame.

OBJECT OF THE INVENTION

Thus, the object of my present invention is to provide a method of and means for recovering supplemental information in such an LDM system designed to obviate the need for a periodically transmitted alignment word and capable of being realized by a relatively simple circuit arrangement.

SUMMARY OF THE INVENTION

In accordance with my present invention, a stream of partly supermodulated multilevel symbols arriving at the receiving end of a signal path is organized in a recurrent incoming frame normally consisting of N symbol periods, corresponding to the number of such periods in an outgoing frame into which the symbol stream is divided at a transmitting end. The modulable waveforms in each incoming frame are detected by comparison of the symbol amplitudes with at least one predetermined threshold, e.g. the one representing the lower range limit of the maximum normal amplitude level; if both maximum and minimum levels are utilized for supermodulation, as in the specific embodiment described hereinafter, two thresholds will be used for this purpose. A count of the first k modulable waveforms in each incoming frame establishes a recovery interval followed by a redundancy interval; demodulation of these first k modulable waveforms by comparison with a further threshold or pair of thresholds produces a reconstituted binary word with "1" bits and "0" bits respectively derived from supermodulated and unaltered waveforms. With proper synchronization of incoming and outgoing frames, and in the absence of possible transmission errors, supermodulated waveforms will be encountered only during the recovery interval; in practice, however, such errors may give rise to some supermodulated waveforms in the redundancy interval even with perfect frame alignment.

In order to determine the presence or absence of such alignment and to take the necessary corrective measures for initially synchronizing or possibly resynchronizing the incoming and outgoing frames with each other, my invention provides for a separate counting of the supermodulated waveforms occurring in at least a certain part of the redundancy interval as well as in at least a certain part of the recovery interval; the number of waveforms counted in the redundancy interval is correlated with that of waveforms counted in the recovery interval by comparing their ratio, generally over a succession of incoming frames, with a predetermined critical value which would be indicative of a lack of synchronism. When the critical value is exceeded by that ratio, the number of symbol periods of a current incoming frame is temporarily modified for more nearly aligning the following frames with the corresponding outgoing frames at the transmitting end.

Advantageously, pursuant to a more particular feature of my invention, supermodulated waveforms are separately counted in a first zone of the redundancy interval close to the preceding recovery interval and in a second zone thereof close to the end of the incoming frame. Depending on which count predominates, i.e. whether the count in the first or in the second section of the redundancy interval bears a ratio to the count in the recovery interval exceeding a respective critical value, the next incoming frame is either lengthened or shortened.

In principle, the number k of supplemental bits used in each outgoing frame may be as low as 1; in that case there is a probability that, with proper alignment, a single modulable waveform occurring in the recovery interval will be supermodulated in every other incoming frame on the average. In order to increase that probability, with a view to distinguishing more clearly over spurious supermodulations detected in the redundancy interval, I prefer to use more than one bit per frame to convey the supplemental information. Thus, with $k>1$ I can assign an invariable value of 1 to at least one bit (e.g. the first one) of the superimposed binary code word transmitted in each frame and can count the number of supermodulations of the corresponding (e.g. the first) modulable waveform. With $K>2$, in fact, both the first and the last bit of the superimposed code word may be invariably of unity value whereby a scanning of the first and $k^{th}$ modulable waveforms of each incoming frame will yield two supermodulations per frame in the event of synchronous operation and in the absence of transmission erros. Such an embodiment is described hereinafter with $k=10$ so that each binary word represents an 8-bit code combination or byte preceded and followed by logical "1."

A system for recovering supplemental message signals in accordance with my present method comprises, at the receiving end of the signal path, timing means connected to that path for extracting a train of clock pulses at the cadence of the symbol periods from the arriving composite stream, first counting means of variable cycle length connected to the timing means for establishing an incoming frame normally consisting of N symbol periods, threshold means connected to the signal path for emitting a marking pulse on one lead in the resence of any modulable waveform and for emitting a demodulation pulse on another lead in the presence of any supermodulated waveform, second counting means connected to the first-mentioned lead and resettable by a start pulse from the first counting means for establishing a recovery interval starting with the beginning of each incoming frame and ending with the $k^{th}$ marking pulse generated in that frame, this recovery interval being followed by a redundancy interval lasting until the end of the frame as described above, output means connected to the other lead of the threshold means and to the second counting means for reconstituting the original binary word—superimposed upon the symbol stream at the transmitting end—from the marking and demodulation pulses generated during the recovery interval, third counting means connected to that other lead and controlled by the first and second counting means for determining the number of demodulation pulses generated in at least a certain part of the redundancy interval, fourth counting means also connected to that other lead and controlled by the second counting means for determining the number of demodulation pulses generated in at least a certain part of the recovery interval, and circuit means connected to the first, third and fourth counting means for determining the count ratio of the third and fourth counting means and, whenever that ratio surpasses a predetermined critical value as discussed above, temporarily modifying the cycle length of the first counting means to approach and eventually establish synchronism with the outgoing frames into which the symbol stream is divided at the transmitting end.

A simple way of establishing the above-discussed ratio of counts and comparing it with a critical value resides in designing the fourth counting means as one or more cyclic reference counters each resetting a respective error counter of the third counting means upon reaching a predetermined count. Thus, if such a reference counter reaches its maximum count earlier than does the corresponding error counter, the ratio of their counts has not attained the critical value and synchronism is presumed to exist. Otherwise, a disalignment signal emitted by that error counter causes a modification of the operating cycle of a clock-pulse counter constituting the first counting means.

In order to determine whether that cycle ought to be lengthened or shortened, I prefer to provide logical circuitry connected to the threshold means and to the first and second counting means for modifying the operation of the third counting means during the redundancy interval so as to establish a first counting mode yielding a first ratio of counts in a zone of the redundancy interval close to the recovery interval and a second counting mode yielding a second ratio of counts in a zone of the redundancy interval close to the end of the incoming frame. These different counting modes may be carried out by mutually independent error counters of the third counting means activated at different times by the logical circuitry and resettable by the cyclic reference counters of the fourth counting means.

BRIEF DESCRIPTION OF THE DRAWING

These and other features of my present invention will now be described in detail with reference to the accompanying drawing in which.

SPECIFIC DESCRIPTION

In order to facilitate comparison, I have used in the drawing the same reference characters as in my prior U.S. Pat. No. 4,131,761 to the extent that corresponding elements are disclosed there.

Figure 1:
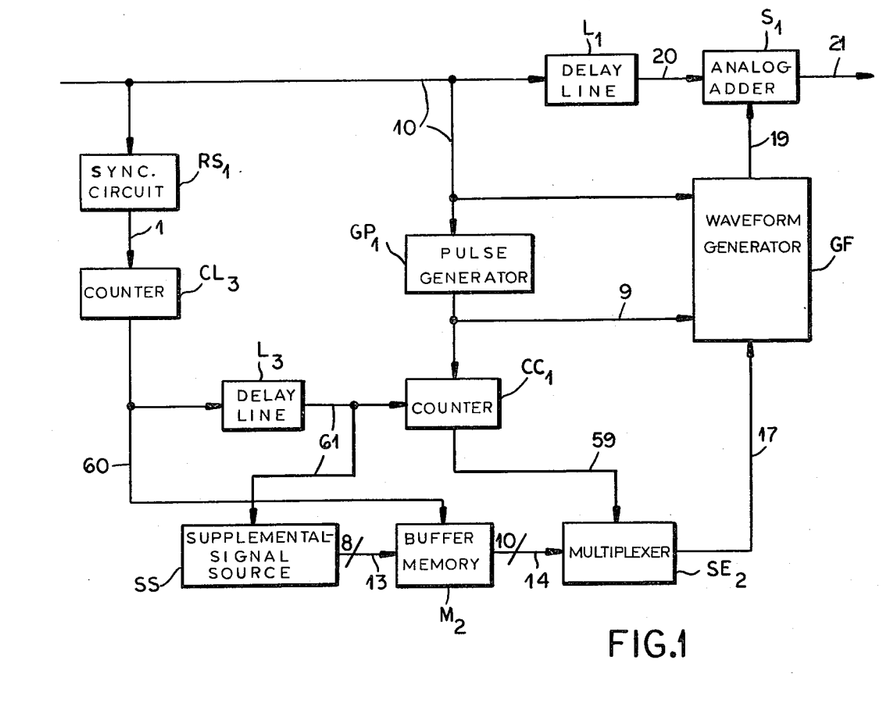
FIG. 1 is a block diagram of a transmitting unit superimposing supplementary message bits upon a sequence of multilevel symbols to produce a composite signal stream.
Figure 4:
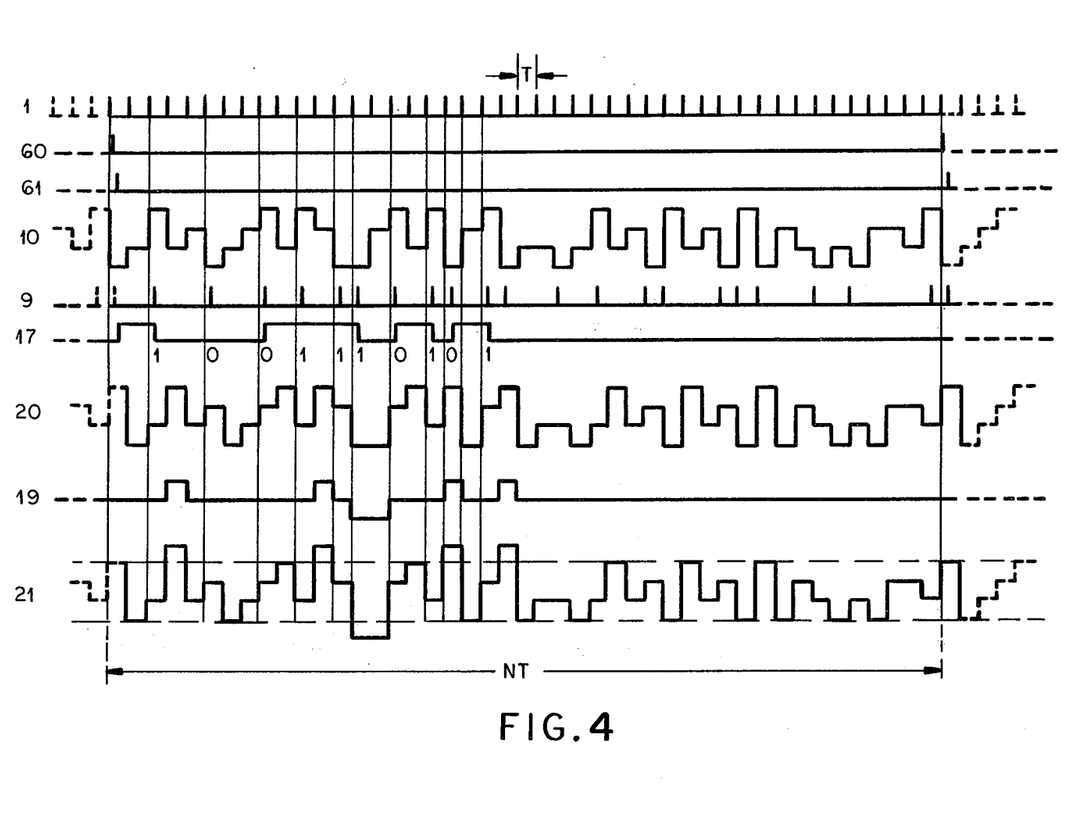
FIG. 4 is a set of graphs showing signals emitted on correspondingly designated leads of FIG. 1.

In FIG. 1 I have shown a line 10 carrying a stream of symbols in the form of pulses of uniform duration T whose amplitudes vary among four levels as illustrated in the correspondingly designated graph of FIG. 4. This symbol stream, conveying primary information, is fed to a synchronizing circuit $RS_1$, a pulse generator $GP_1$, a delay line $L_1$ and a waveform generator GF. Circuit $RS_1$ extracts from the sequence of multilevel pulses a train of clock pulses, coinciding with symbol periods T, which are fed to a cyclic counter $CL_3$ on a lead 1 and have been illustrated in the correspondingly labeled graph of FIG. 4. Counter $CL_3$ resets itself after every $N^{th}$ clock pulse while emitting a frame-starting pulse on a lead 60, again as shown in FIG. 4 on a graph so labeled. This start pulse is delivered on the one hand to a clearing input of a buffer memory $M_2$ and on the other hand, through a delay line $L_3$ via a lead 61, to a supplemental-signal source SS which has an output multiple 13 with eight leads terminating at respective cells of memory $M_2$.

Pulse generator $GP_1$ detects modulable waveforms in the symbol stream arriving over line 10, i.e. pulses of either the lowest or the highest amplitude level, and in the presence of such waveforms emits a marking pulse on a lead 9 which extends to waveform generator GF as well as to a dead-end counter $CC_1$ with a counting capacity $k+1=11$. The delayed start pulse on lead 61 (see the third graph in FIG. 4) is also applied to counter $CC_1$ and resets same to a reading of "0", this reading being transmitted via a line 59 to a switching input of a multiplexer $SE_2$ with ten data inputs and one output. The ten data inputs of multiplexer $SE_2$ are connected via a 10-lead multiple 14 to the outputs of respective cells of memory $M_2$ while its single data output is connected by way of a lead 17 to waveform generator GF. The latter has an output lead 19 extending to an analog adder $S_1$ which also receives the four-level symbol stream from line 10 by way of a delay line $L_1$ and a lead 20. Adder $S_1$ superimposes output pulses from generator GF, which would be of either positive or negative polarity as illustrated in graph 19 of FIG. 4, upon corresponding modulable waveforms of the delayed symbol stream (graph 20 in FIG. 4) to produce on an output lead 21 a composite stream, as shown in the last graph of FIG. 4, to be transmitted to a receiving station over an intervening signal path.

The time between successive start pulses on lead 60 encompasses a series of N symbols constituting an outgoing frame of duration NT. In the example here given, this duration equals that of a subframe described in my prior patent, with N=45. It will also be assumed that a binary word read out from buffer memory $M_2$ via multiple 14 has the same configuration as the one chosen by way of example in that prior patent, namely 1 0 0 1 1 1 0 1 0 1.

In the preferred embodiment being described, the first and the last bit of logical value "1" are not part of a supplemental message emitted by source SS but are hard-wired in memory $M_2$ so as to be read out when the first and the last cell of that memory are scanned by multiplexer $SE_2$ under the control of counter $CC_1$. The $k-2=8$ intervening bits form an octet or byte carrying the supplemental message to be conveyed to the receiving station in an initial part of each frame, these bits being sent from source SS to memory $M_2$ in response to the delayed start pulse on lead 61 after that memory has been cleared by the undelayed start pulse on lead 60.

Counter $CC_1$ is stepped by the first k=10 marking pulses on lead 9 so as to switch the multiplexer $SE_2$ successively to the several output leads of memory $M_2$ whereby the two fixed and eight variable bits stored in that memory are sequentially read out to generator GF illustrated in graph 17 of FIG. 4. Triggered by the accompanying marking pulses from lead 9, this generator determines whether the modulable waveforms simultaneously appearing on line 10 are at the lowest or at the highest amplitude level. In the first case, and in the presence of a "1" bit on lead 17, generator GF emits a negative supermodulating pulse to adder $S_1$ as illustrated in graph 19 of FIG. 4 for the fifth and sixth bits of the binary code word shown in graph 17; in the second case, and again the presence of a "1" bit on lead 17, the supermodulation pulse generated on lead 19 is of positive polarity as illustrated for the first, fourth, eighth and tenth bits. No supermodulation pulse is emitted in the presence of "0" bits.

The delay of line $L_1$ is such as to make the supermodulation pulses on lead 19 coincide with the arrival of the corresponding modulable waveforms on lead 20 as will be noted from a comparison of graphs 10, 19 and 20 in FIG. 4. Thus, the first and the tenth modulable waveforms of each outgoing frame are invariably supermodulated while the intervening modulable waveforms may or may not be altered, depending on the bit configuration of the byte delivered by source SS.

When the counter $CC_1$ has taken its tenth step, it remains in its eleventh state "10" in which it switches multiplexer $SE_2$ into a position maintaining the signal level on lead 17 permanently at zero. Thus, no further supermodulation pulses are fed by generator GF to analog adder $S_1$ for the remainder of the frame.

With four amplitude levels including two limiting levels, as in the example given, the probable number of modulable waveforms occurring among N symbols will generally be N/2 so that in all likelihood each frame composed of 45 symbols will contain more than the ten waveforms needed to carry the supplemental code word. If, by chance, the number of modulable waveforms should be less than ten in any given frame, that code word will be correspondingly truncated.

Figure 2:
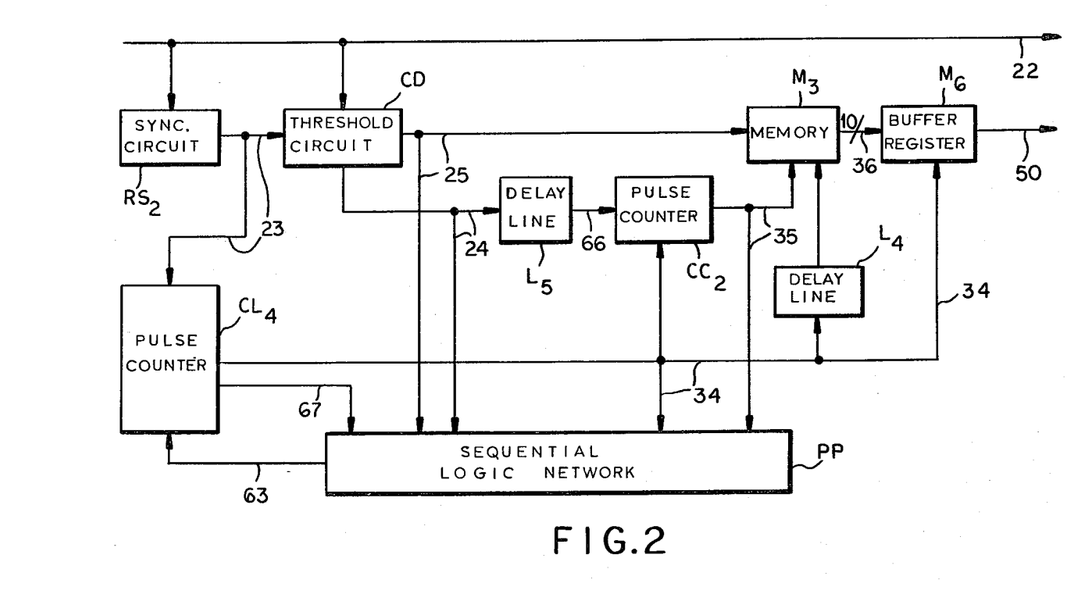
FIG. 2 is a block diagram of a receiving unit for retrieving, according to my present invention, the superimposed message bits from the composite stream produced by the unit of FIG. 1.

Reference will now be made to FIG. 2 which shows part of a receiving station with an input lead 22 linked by the aforementioned signal path with the output lead 21 of FIG. 1. This signal path could be a simple metallic line or, possibly, a radio link operating with an amplitude-modulated or frequency-modulated carrier for example. In any event, the composite symbol stream arriving on lead 22 has essentially the same configuration as the one leaving the transmitting station by way of lead 21; this will be apparent from a comparison of the bottom graph 21 of FIG. 4 with the top graph 22 of FIG. 5.

A synchronizing circuit $RS_2$, similar to circuit $RS_1$ of FIG. 1, is connected to lead 22 and delivers a train of clock pulses on a lead 23 to a cyclic counter $CL_4$ and in parallel therewith to an enabling input of a decision circuit CD with four thresholds having a data input connected to lead 22. Decision circuit CD has two output leads 24 and 25, the former carrying a marking pulse upon the detection of any modulable waveforms with amplitudes above an upper or below a lower threshold whereas the latter carries a demodulation pulse in the presence of a supermodulated waveform whose amplitude surpasses a still higher threshold or falls short of a still lower threshold; for simplicity's sake it will be assumed that all these amplitudes are of the same positive polarity. Leads 24 and 25 both extend to a sequential logic network PP more fully described hereinafter with reference to FIG. 3. Lead 24 is also connected via a delay line $L_5$ and an extension 66 to a stepping input of a dead-end pulse counter $CC_2$ similar to counter $CC_1$ of FIG. 1. Lead 25 is further connected to a data input of a read/write memory $M_3$ from which a 10-lead multiple 36 extends to respective inputs of a 10-stage buffer register $M_6$ provided with a similar output multiple 50.

Pulse counter $CL_4$ has an adjustable operating cycle normally corresponding to N=45 clock pulses extracted by circuit $RS_2$. This cycle can be modified, as subsequently described, by a command on an output line 63 of network PP. At the end of its cycle, counter $CL_4$ emits a pulse on a lead 34 while resetting itself to commence a new incoming frame. Lead 34 extends to network PP, to a resetting input of counter $CC_2$, to an unloading input of buffer register $M_6$ and to a delay line $L_4$ connected by a lead 65 to an unloading input of memory $M_3$. Pulse counter $CC_2$ has an output multiple 35 delivering its instantaneous count to an address input of memory $M_3$ as well as to network PP. A similar output multiple 67 extends from clock-pulse counter $CL_4$ to the network.

Figure 3:
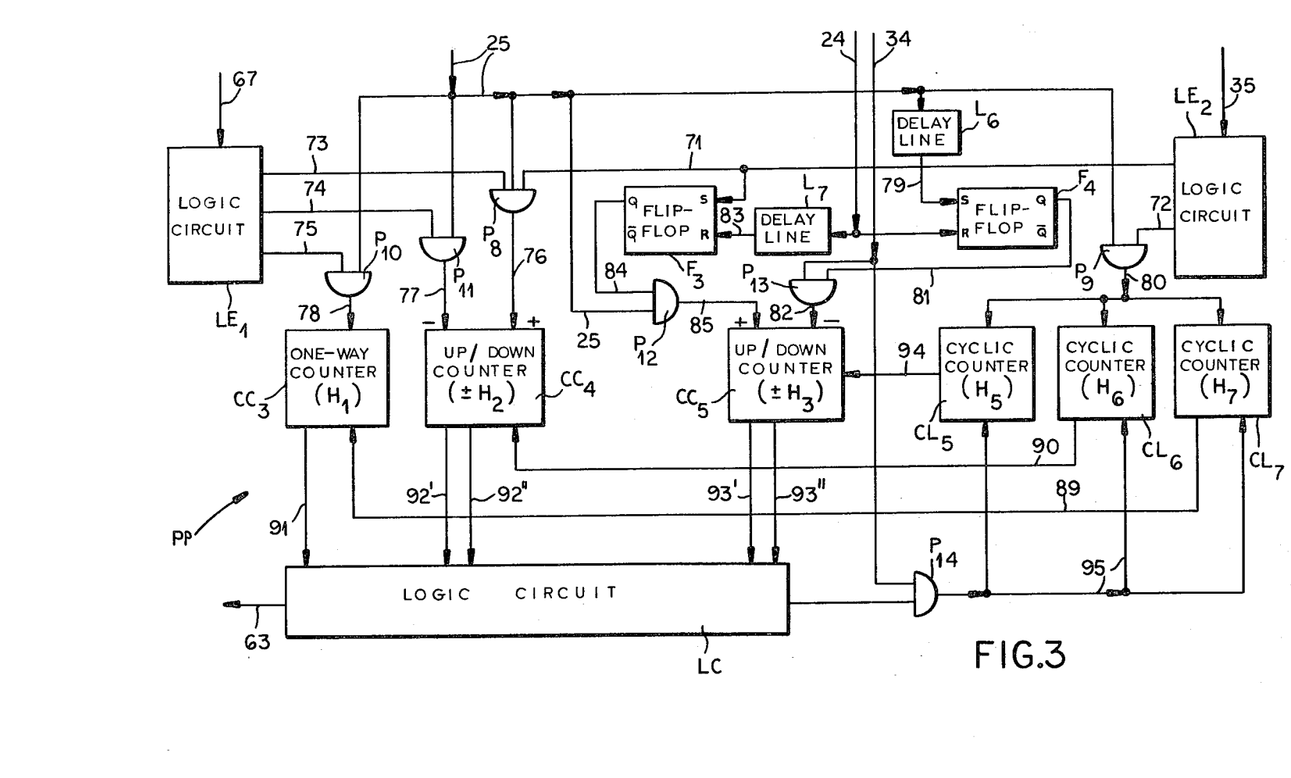
FIG. 3 is a block diagram of a logic network shown in FIG. 2.

FIG. 3 shows details of network PP comprising several logic circuits LC, $LE_1$ and $LE_2$, the latter two circuits having inputs respectively connected to output multiples 67 and 35 of pulse counters $CL_4$ and $CC_2$ (FIG. 2). A one-way counter $CC_3$ and two up/down counters $CC_4$ and $CC_5$ together constitute the "third counting means" referred to under "Summary of the Invention." Three AND gates $P_8$, $P_{10}$ and $P_{11}$ have first inputs connected to respective output leads 73, 75 and 74 of logic circuit $LE_1$ and further have second inputs tied to lead 25; gate $P_8$ also has a third input connected to an output lead 71 of logic circuit $LE_2$. Gates $P_8$ and $P_{11}$ have output leads 76 and 77 respectively terminating at a forward-stepping input and at a backward-stepping input of counter $CC_4$. Gate $P_{10}$ has an output lead 78 terminating at a forward-stepping input of counter $CC_3$. Counter $CC_5$ has a forward-stepping input joined to an output lead 85 of an AND gate $P_{12}$ with inputs respectively tied to lead 25 and to a lead 84 extending from a set output (Q) of a flip-flop $F_3$; a backward-stepping input of this counter is joined to an output lead 82 of an AND gate $P_{13}$ with one input tied to lead 34 and another input tied to a lead 81 extending from a set output of a flip-flop $F_4$. Flip-flop $F_3$ has a setting input (S) tied to lead 71 and a resetting input (R) connected via a delay line $L_7$ to lead 24. The setting input of flip-flop $F_4$ is connected to lead 25 by way of a delay line $L_6$ and a lead 79 while its resetting input is directly tied to lead 24. The reset outputs (Q) of flip-flops $FF_3$ and $FF_4$ are not used. Three cyclic pulse counters $CL_5$, $CL_6$ and $CL_7$, together constituting the "fourth counting means" referred to under "Summary of the Invention," have inputs connected in parallel to an output lead 80 of an AND gate $P_9$ with two inputs respectively tied to lead 25 and to an output lead 72 of logic circuit $LE_2$.

Error counters $CC_3$, $CC_4$ and $CC_5$ supply their contents to logic circuit LC via respective output leads 91, 92′/92″ and 93′/93″. Output lead 91 is energized whenever counter $CC_3$ reaches a critical numerical threshold or modulus $H_1$. Output leads 92′ and 92″ carry voltage when counter $CC_4$ reaches a modulus $+H_2$ or $-H_2$, respectively. Similarly, counter $CC_5$ energizes its output leads 93′ or 93″ upon reaching a respective modulus $+H_3$ or $-H_3$.

Cyclic reference counters $CL_5$, $CL_6$ and $CL_7$ have output leads 94, 90 and 89 terminating at respective resetting inputs of error counters $CC_5$, $CC_4$ and $CC_3$ with which they are paired. Leads 94, 90 and 89 are energized whenever the corresponding cyclic counters reach respective moduli $H_5$, $H_6$ and $H_7$ which also cause their own resetting.

Logic circuit LC controls the operating cycle of clock-pulse counter $CL_4$ (FIG. 2) via its output line 63 and has another output lead 96 terminating at a first input of an AND gate $P_{14}$ whose second input is tied to lead 34. An output lead 95 of gate $P_{14}$ extends to respective resetting inputs of reference counters $CL_5$, $CL_6$ and $CL_7$.

Thus, the three cyclic counters $CL_5$, $CL_6$, $CL_7$ of the fourth counting means and their mates $CC_5$, $CC_4$, $CC_3$ of the third counting means establish respective critical values $H_3/H_5$, $H_2/H_6$ and $H_1/H_7$ which, on being exceeded by the ratios of their pulse counts at the time one of them reaches its modulus, give rise to a disalignment signal transmitted to logic circuit LC over the respective lead 93′/93″, 92′/92″ or 91. Depending on the nature of this signal, circuit LC commands a modification of the operating cycle of counter $CL_4$.

The operation of the circuit arrangement of FIGS. 2 and 3 will now be described with reference to FIG. 5 whose graphs, designated in conformity with various leads referred to above, show the voltages respectively appearing on these leads in the course of an incoming frame.

Figure 5:
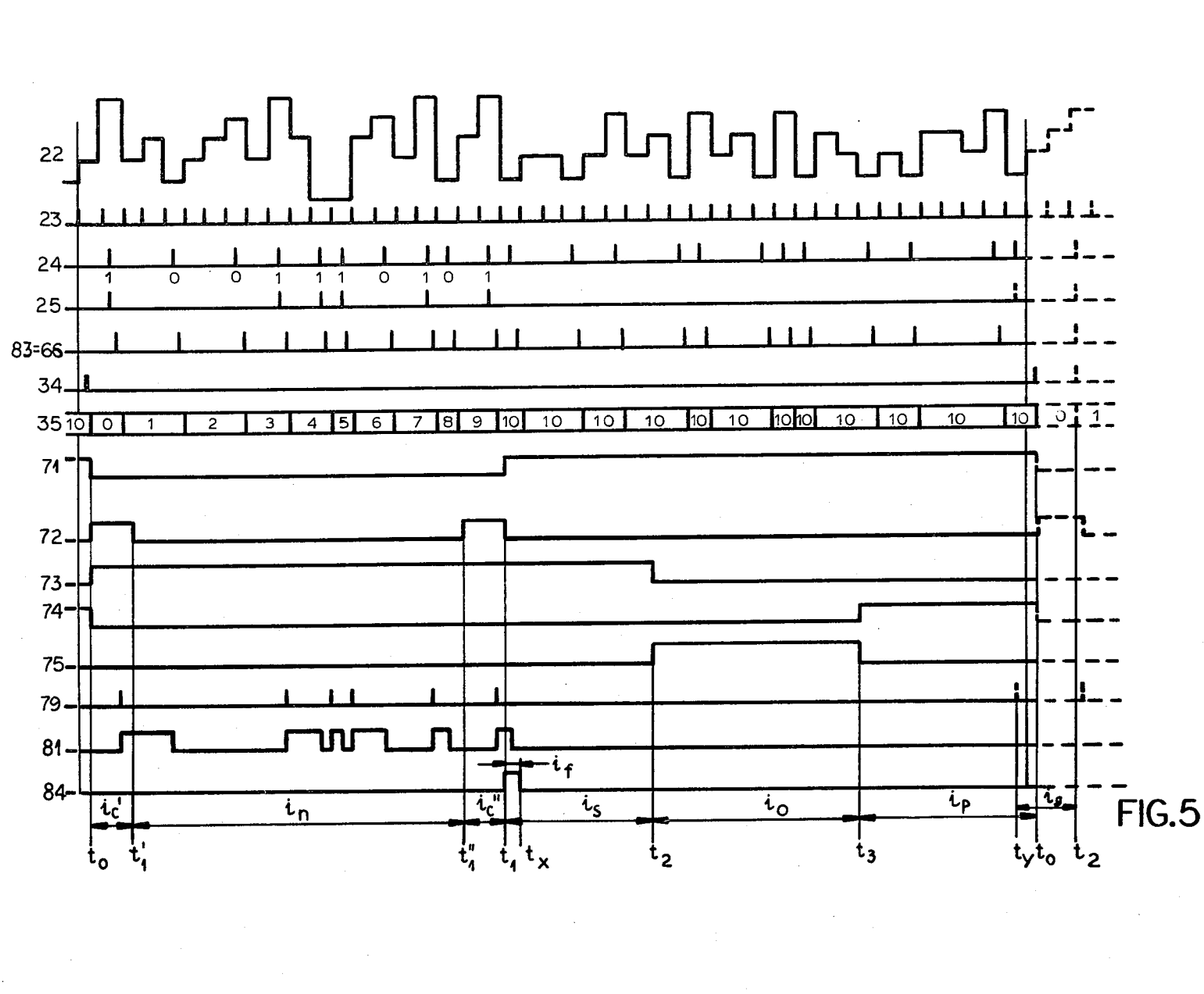
FIG. 5 is a set of graphs showing signals emitted on correspondingly designated leads of FIGS. 2 and 3.

Such a frame, normally encompassing N=45 clock pulses emitted by circuit $RS_2$ on lead 23, is assumed in FIG. 5 to be aligned with the outgoing frame illustrated in FIG. 4 so that the supplemental bits of the superimposed code word are correctly presented by the first ten modulable waveforms shown in graph 22. The frame begins and ends with a start pulse emitted by clock-pulse counter $CL_4$ (graph 34) which resets the marking-pulse counter $CC_2$ to its "0" state as shown in graph 35. As the first bit of a supplemental code word is invariably of logical value "1," threshold circuit CD emits a marking pulse on lead 24 and a demodulation pulse on lead 25 upon detecting the first modulable waveform which happens to be the second symbol of the incoming stream. The first ten marking pulses shown in graph 24 appear with a delay due to line $L_5$ at the stepping input of counter $CC_2$ which therefore successively advances to its final count "10." With lines $L_5$ of FIG. 2 and $L_7$ of FIG. 3 introducing equal delays, the fifth graph of FIG. 5 represents the marking pulses appearing on both leads 66 and 83.

Logic circuit $LE_2$ responds to the first state "0" and the $k^{th}$ state "9" of counter $CC_2$, transmitted to it via multiple 35, by energizing its output lead 72 to unblock the gate $P_9$ which is blocked at all other times. The initial resetting of counter $CC_2$ causes the removal of voltage from the previously energized output lead 71 of circuit $LE_2$, this lead being re-energized as soon as counter $CC_2$ reaches its dead-end state "10." Thus, gate $P_8$ is blocked during the counting of the first ten modulable waveforms.

The contents of cyclic counter $CL_4$, stepped by the clock pulses of graph 23, are transmitted via multiple 67 to logic circuit $LE_1$ which energizes its output lead 73 and de-energizes its output lead 74 in response to the resetting of that counter at the end of its cycle, i.e. at an instant $t_0$. Lead 73 is de-energized at a time $t_2$ when the number of steps taken by counter $CL_4$ is well above N/2; at the same time the lead 75 is energized. De-energization of lead 75 and re-energization of lead 74 occur at a still later time $t_3$ when counter $CL_4$ has a reading relatively close to its normal maximum value N. Thus, instants $t_0$, $t_2$ and $t_3$ are fixed time positions within each frame of normal length NT.

Other instants $t_1'$, $t_1''$ and $t_1$ occur at variable times, namely in response to the delayed first, ninth and tenth marking pulses on lead 66 advancing the counter $CC_2$ into states "1," "9" and "10," respectively. The time between instants $t_0$ and $t_1$ constitutes a recovery interval and consists of an initial phase $i_c'$ coinciding with time $t_0 - t_1'$, an intermediate phase $i_n$ extending from instant $t_1'$ to instant $t_1''$, and a final phase $i_c''$ coinciding with time $t_1'' - t$. The time between instant $t_1$ and $t_0$ at the beginning of the next frame is designated a redundancy interval and includes a first zone $i_s$ between instants $t_1$ and $t_2$, a second zone $i_o$ between instants $t_2$ and $t_3$, and a third zone $i_p$ between instants $t_3$ and $t_0$.

It will be convenient to refer to phases $i_c'$ and $i_c''$ collectively as an alignment-recognition zone $i_c$.

I have further shown in FIG. 5 two additional phases $i_f$ and $i_g$. Phase $i_f$ lies at the beginning of zone $i_s$ and starts at instant $t_1$, ending at an instant $t_x$ which coincides with the occurrence of the next delayed marking pulse on lead 83. Phase $i_g$ starts at a time $t_y$, just before the end of zone $i_p$, upon the generation of the last marking pulse of the frame on lead 24 but only if that marking pulse is accompanied by a spurious or shifted demodulation pulse on lead 25 as indicated in dotted lines in graphs 25 and 79 of FIG. 5; this phase terminates at an instant $t_z$ coinciding with the first undelayed marking pulse of the next frame on lead 24 as likewise indicated in dotted lines on the corresponding graph.

Phase $i_f$ is marked by a pulse on the output lead 84 of flip-flop $F_3$ which is set by the positive-going voltage on lead 71 and is reset by the next-following pulse on lead 83. If a spurious or shifted demodulation pulse occurs at this time on lead 25, AND gate $P_{12}$ conducts and energizes its output lead 85 whereby error counter $CC_5$ takes one step forward. Flip-flop $F_4$ is set with every delayed demodulation pulse on lead 79 but is promptly reset by the next-following marking pulse on lead 24; if the energization of the output lead 81 of this flip-flop is not followed by a further marking pulse before the end of the frame so that a start pulse will appear on lead 34 prior to the resetting of the flip-flop, conduction of gate $P_{13}$ energizes its output lead 82 whereby counter $CC_5$ is stepped backward.

AND gate $P_8$ is unblocked in zone $i_s$ by the simultaneous energization of output leads 71 and 73 of logic circuits $LE_2$ and $LE_1$. If an out-of-turn demodulation pulse appears on lead 25 during that time, gate $P_8$ energizes its output lead 76 to step the error counter $CC_4$ forward. AND gate $P_{11}$ is enabled during zone $i_p$, by voltage on output lead 75 of logic circuit $LE_1$, to energize its own output lead 77 in the presence of an untimely marking pulse on lead 74 for stepping that counter backward. The energization of output lead 75 of logic circuit $LE_1$, coinciding with zone $i_o$, enables AND gate $P_{10}$ to feed an untimely marking pulse on lead 25 via its own output lead 78 to the stepping input of error counter $CC_3$.

It should be noted that the first zone $i_s$ of the redundancy interval will be suppressed if the number of modulable waveforms in the first half of a frame is so low that the tenth marking pulse, determining the end of the recovery interval, will not occur before instant $t_2$. Phase $i_f$, however, will come into existence even under these circumstances.

While zones $i_s$, $i_o$ and $i_p$ are shown to be contiguous within the redundancy interval, this is not necessarily the case. Thus, the periods of conduction of leads 73, 74 and 75 could be separated by intervening gaps or could be made overlapping in some instances.

The co-operation of error counters $CC_3$, $CC_4$ and $CC_5$ with logic circuit LC will become readily apparent from the following Table wherein $n_1$, $n_2$ and $n_3$ denote the respective contents of these counters at a time just before their resetting by the associated reference counters $CL_7$, $CL_6$ and $CL_5$. The Table also shows the binary signal $s_{96}$ on output lead 96 of circuit LC as well as the duration of a cycle (in terms of number of clock pulses $p_{23}$) of counter $CL_4$ as determined by a command from circuit LC emitted via connection 63.

TABLE

|  | $n_1$ | $n_2$ | $n_3$ | $p_{23}$ | $s_{96}$ |
|---|---|---|---|---|---|
| I | $n_1 < H_1$ | $-H_2 < n_2 < +H_2$ | $-H_3 < n_3 < +H_3$ | N | "0" |
| II | $n_1 \geqq H_1$ | $-H_2 < n_2 < +H_2$ | $-H_3 < n_3 < +H_3$ | $N + N_1$ | "1" |
| III | X | $n_2 \geqq +H_2$ | $-H_3 < n_3 < +H_3$ | $N + N_2$ | "1" |
| IV | X | $n_2 \leqq -H_2$ | $-H_3 < n_3 < +H_3$ | $N - N_2$ | "1" |
| V | X | X | $n_3 = +H_3$ | $N + N_3$ | "1" |
| VI | X | X | $n_3 = -H_3$ | $N - N_3$ | "1" |

The letter X in the foregoing Table is a "DON'T CARE" symbol indicating that the particular count $n_1$ or $n_2$ has no effect upon the generation of logic circuit LC.

Row I of the Table relates to steady-state operation with alignment of the frames of FIGS. 4 and 5. Unless there is an error in transmission, or a dearth of modulable waveforms in some frames which would extend the recovery period beyond instant $t_2$, counters $CL_5$, $CL_6$ and $CL_7$ will each be stepped twice in the alignment-recognition zone $i_c$ of each incoming frame. Error counters $CC_3$, $CC_4$ and $CC_5$ may be stepped occasionally in the presence of spurious demodulation pulses, yet their final counts $n_1$, $n_2$ and $n_3$ will remain within the limits of 0 to $H_1$, $-H_2$ to $+H_2$ and $-H_3$ to $+H_3$ up to the time that the three reference counters $CL_5$, $CL_6$ and $CL_7$ will have reached their respective moduli $H_5$, $H_6$ and $H_7$. These cyclic reference counters will therefore reset themselves and the error counters respectively paired therewith; the absence of a modification command on line 63 and of voltage on lead 96 will maintain the status quo, with counter $CL_4$ resetting itself after every N=45 clock pulses $p_{23}$.

Let us assume, now, that at the beginning of operations or possibly at some other time there exists a substantial disalignment between the incoming and outgoing frames so that the first or the last bit of the superimposed message word, with its invariable value of "1," appears in zone $i_o$ of the redundancy interval $t_1 - t_0$. In this case the three reference counters $CL_5$, $CL_6$ and $CL_7$ will take few if any steps while gate $P_{10}$ will be passed by relatively many demodulation pulses. Thus, the contents $n_1$ of error counter $CC_3$ will reach its modulus $H_1$ before being reset by reference counter $CL_7$ and will energize its ouput lead 91, thereby giving rise to a modification command on line 63 which results in the lengthening of the current cycle to $N+N_1$ clock pulses as indicated in row II of the Table. Lead 96 then carries a signal $s_{96}$ of logical value "1" which unblocks the gate $P_{14}$; at the end of the lengthened counting cycle, and thus at the beginning of a new frame, the start pulse on lead 34 will pass via gate $P_{14}$ to lead 95 to reset the three reference counters with consequent resetting of the three error counters. This terminates the energization of lead 91 so that the next frame will be of normal length unless one of the error counters intervenes again.

The increment $N_1$ in the number of clock pulses registered by counter $CL_4$ may have a magnitude on the order of N/4 roughly corresponding to the time between the midpoint of zone $i_o$ and the frame-starting point corresponding to instant $t_0$. It may happen that the resulting shift of time position $t_0$ properly aligns the next binary word with the first ten modulable waveforms of the new frame, in the manner shown in FIG. 5, with avoidance of the need for any further corrective action. With greater likelihood, however, the next frame will find the first or the last supermodulated waveform in one of the zones of the redundancy interval, e.g. zone $i_s$. This will cause the forward stepping of counter $CC_4$ by demodulation pulses traversing the gate $P_8$ so that its reading $n_2$ will attain the modulus $+H_2$ as indicated in row III of the Table, with resulting energization of output lead 92'. Thus, the current frame will be lengthened by a number of clock pulses $N_2$ in response to a command on line 63; the signal $s_{96}$ in the other output of logic circuit LC will again be high. Upon the appearance of the next start pulse on lead 34, the cyclic reference counters $CL_5$, $CL_6$ and $CL_7$ will again be reset together with error counter $CC_4$. The increment $N_2$ may be substantially less than $N_1$ and could be as low as one clock pulse.

Row IV of the Table relates to the case where counter $CC_4$ is stepped backward by a concentration of supermodulated waveforms in zone $i_p$ which causes the corresponding demodulation pulses to traverse the gate $P_{11}$. When the negative reading $n_2$ of this counter equals the modulus $-H_2$, its output lead 92" is energized with a result differing from that of the previous case in that the cycle of counter $CL_4$ is shortened rather than lengthened by a number of clock pulses $N_2$. The need for a low value of decrement $-N_2$ arises from the possibility that counter $CC_4$ may energize its output 92" in the next-to-last clock cycle of the current frame which could then be foreshortened by only one clock pulse before the arrival of the next start pulse. It will be evident, however, that the increment $+N_2$ could be of larger absolute magnitude than the decrement $-N_2$.

Let us now consider the case in which the last demodulation pulse of an incoming frame is generated by the eleventh instead of the tenth modulable waveform of the symbol stream arriving over lead 22. This may happen, for example, if the incoming frame is shifted by one clock pulse from a previous position of alignment. That demodulation pulse will then fall within phase $i_f$ in which gate $P_{12}$ is unblocked as described above; counter $CC_5$ will therefore be stepped forward to energize its output lead 93' until, after a sufficient number of frames, its reading $n_3$ reaches the modulus $+H_3$ as indicated in row V of the Table. The modification command emitted on line 63 by logic circuit LC will now lengthen the immediately following frame by an incremental value $+N_3$ advantageously equal to one clock cycle. Since only one demodulation pulse can pass the gate $P_{12}$ during phase $i_f$, counter $CC_5$ will never be stepped beyond its modulus $+H_3$ before being reset at the beginning of the next frame; this contrasts with counters $CC_3$ and $CC_4$ whose contents could go beyond their respective moduli $H_1$ and $\pm H_2$.

Suppose, now, that the first unity bit of the supermodulated code word happens to coincide with the last modulable waveform of an incoming frame accidentally lengthened by one clock cycle. In this event, as discussed above, the next start pulse on lead 34 will occur while gate $P_{13}$ is unblocked by flip-flop $F_4$ so that counter $CC_5$ will take one step back. After repeated occurrences of this situation, the counter will reach its lower modulus $-H_3$ and will energize its output lead 13" during the frame initiated by that start pulse. This new frame will therefore be foreshortened by a decremental value $-N_3$, again advantageously corresponding to one clock pulse, as indicated in row VI of the Table.

Since counter $CC_5$ is capable of correcting alignment errors due to a shift by a single clock pulse, its operation should have priority over that of the other error counters. This, too, has been made clear in the Table where the symbol X indicates an order of preference with counter $CC_4$ ranking below counter $CC_5$ but above counter $CC_3$. Thus, the operation of logic circuit LC in response to a disalignment signal from counter $CC_5$ will be unaffected by a simultaneous or subsequent energization of lead 91, 92' or 92" in the same frame.

The various moduli $H_1$, $H_2$, $H_3$, $H_5$, $H_6$ and $H_7$ should of course be selected in relation to one another on the basis of statistical probability of alignment errors detectable by counters $CC_3$, $CC_4$ and $CC_5$. Thus, for example, the probability of incidence of spurious supermodulated waveforms due to transmission errors during steady-state operation is much higher in zone $i_o$ than in zones $i_f$ and $i_g$ each of which accommodates only one waveform per frame; the ratio $|H_3|/H_5$ may therefore be chosen substantially lower than, say, the ratio $H_1/H_7$. In some cases it may be sufficient to use a single reference counter for the resetting of all three error counters, e.g. upon a count of 2 normally corresponding to a single frame. It will also be obvious that more or less than three error counters may be used for monitoring different zones of the redundancy interval.

Figure 6:
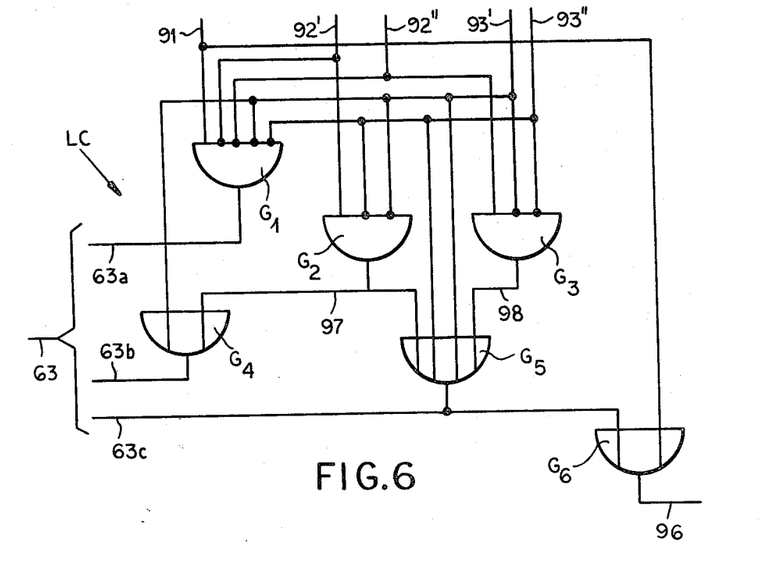
FIG. 6 is a more detailed circuit diagram of a cyclic clock-pulse counter shown in FIG. 2.
Figure 7:
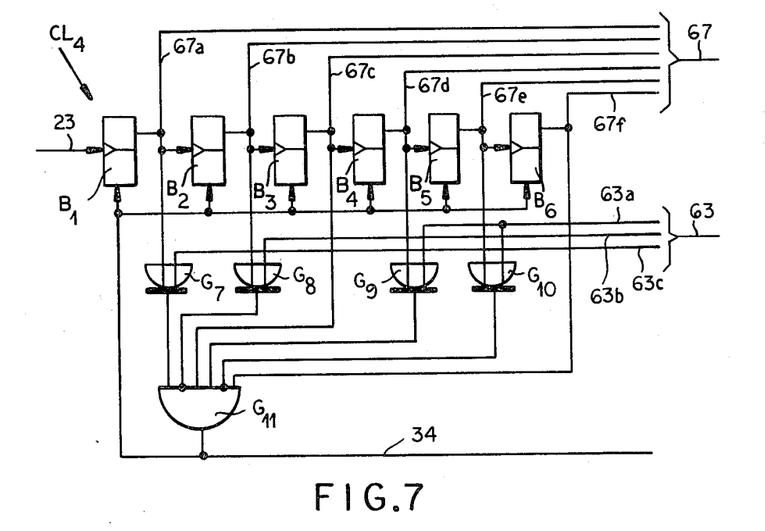
FIG. 7 is a more detailed diagram of a logic circuit shown in FIG. 3.

In FIGS. 6 and 7 I have illustrated possible circuit arrangements for components LC (FIG. 3) and $CL_4$ (FIG. 2), respectively, designed to enable their operation in the aforedescribed manner. FIG. 6 shows logic circuit LC as comprising three AND gates $G_1$, $G_2$ and $G_3$ along with three OR gates $G_4$, $G_5$ and $G_6$, gates $G_1$, $G_4$ and $G_5$ having respective output leads 63a, 63b and 63c forming part of multiple 63. AND gate $G_1$ has a noninverting input connected to lead 91 and four inverting inputs respectively connected to leads 92', 92", 93' and 93". Leads 93' and 93" are also connected to two pairs of inverting inputs of AND gates $G_2$ and $G_3$ which further have noninverting inputs respectively connected to leads 92' and 92". OR gate $G_5$ has four inputs respectively connected to leads 93', 93" and to output leads 97, 98 of gates $G_2$ and $G_3$. Leads 93' and 97 extend to OR gate $G_4$; OR gate $G_6$, whose output is the lead 96 of FIG. 3, has inputs connected to leads 91 and 63c.

Energization of either output lead 93', 93" of high-priority counter $CC_5$ blocks all three AND gates $G_1$, $G_2$ and $G_3$. Voltage on lead 93' energizes leads 63a and 63c, only the latter lead being energized in the presence of voltage on lead 93". Gate $G_1$ is also blocked in the presence of voltage on lead 92' or 92"; in the first instance (and with leads 93' and 93" de-energized) there will be voltage on leads 63b and 63c while in the second instance such voltage will be limited to lead 63c. With lead 91 the only energized output of any error counter, lead 63a alone has voltage. In each instance, however, OR gate $G_6$ also conducts to emit a high signal $s_{96}$.

Counter $CL_4$ is shown in FIG. 7 to comprise six cascaded binary stages $B_1$–$B_6$ with output leads 67a–67f forming part of multiple 67. An AND gate $G_{11}$, whose output is the lead 34 which extends to resetting inputs of all these binary stages, has a noninverting first input connected to lead 67a by way of an Exclusive-OR (XOR) gate $G_7$, an inverting second input connected to lead 67b via a XOR gate $G_8$, a noninverting third input connected to lead 67c, a noninverting fourth input connected via a XOR gate $G_9$ to lead 67d, an inverting fifth input connected via a XOR gate $G_{10}$ to lead 67e, and a noninverting sixth input connected to lead 67f. XOR gates $G_7$ and $G_8$ have respective second inputs tied to leads 63c and 63b; XOR gates $G_9$ and $G_{10}$ have second inputs both connected to lead 63a.

With none of leads 63a–63c energized in normal steady-state operation, AND gate $G_{11}$ conducts when stages $B_1$–$B_6$ of counter $CL_4$ reach a binary configuration 1 0 1 1 0 1 corresponding to N=45 in decimal notation. Energization of lead 63a causes XOR gates $G_9$ and $G_{10}$ to act as inverters whereby gate $G_{11}$ will conduct only in response to a binary configuration 1 1 0 1 0 1 corresponding to decimal $53=N+N_1$. Joint conduction of leads 63b and 63c inverts the first two bits emitted by stages $B_1$ and $B_2$ to provide a count of 1 0 1 1 1 0 corresponding to decimal $46=N+N_2=N+N_3$. Conduction of lead 63c alone inverts only the least-significant bit so that gate $G_{11}$ will conduct in response to a count of 1 0 1 1 0 0 corresponding to decimal $44=N-N_2=N-N_3$. In this example, therefore, $N_1=8$ whereas $\pm N_2$ and $\pm N_3$ have the same absolute numerical value of 1.

The use of one or preferably two supplemental bits of invariable unity value, as described above, not only helps localize the probable occurrence of supermodulated waveforms upon frame disalignment, especially with an offset of a single clock cycle, but will also preserve the alignment in steady-state operation during times when no supplemental messages are being received from the remote transmitting unit. Nevertheless, my invention is also applicable to systems in which all k bits of a superimposed code word are used for data transmission, including the limiting case of k=1. In such a situation, however, there would be no particular need for dividing the recovery interval into phases $i_c'$, $i_n$, $i_c''$; instead, logic circuit $LE_2$ should then be modified to energize its output lead 72 throughout the entire recovery interval (reception of the first k modulable waveforms) so that the cyclic reference counter or counters are stepped by every supermodulated waveform arriving during that interval. There would also be no reason in such a case for a separate scanning of phase $i_f$ so that flip-flop $F_3$ and AND gate $P_{12}$ could be eliminated; a demodulation pulse occurring immediately after the end of the recovery interval would then simply be registered by error counter $CC_3$ or $CC_4$, as is also true in the embodiment specifically disclosed.

I claim:

1. A method of recovering supplemental message signals at a receiving end of a transmission path from a composite stream of symbols represented by waveforms carrying primary information in the form of amplitude variations among a plurality of levels including two limiting levels and at least one intermediate level, said composite stream being organized at a transmitting end of said path in a recurrent outgoing frame of N symbol periods, said supplemental message signals being coded in a binary word of k bits superimposed in each outgoing frame upon an initial group of k modulable waveforms with amplitudes on at least one of said limiting levels, a modulable waveform carrying a "0" bit of said binary word being unaltered whereas a modulable waveform carrying a "1" bit is supermodulated with an amplitude beyond the limiting level thereof, the number k being substantially less than the number of probable modulable waveforms in a frame,
   comprising the steps of:
   (a) organizing the composite stream arriving at said receiving end in a recurrent incoming frame normally consisting of N symbol periods;
   (b) detecting the modulable waveforms of said composite stream by comparison of their amplitudes with at least one predetermined threshold;
   (c) counting the first k modulable waveforms in each incoming frame to establish a recovery interval followed by a redundancy interval;
   (d) demodulating said first k modulable waveforms to produce a reconstituted binary word with "1" bits and "0" bits respectively derived from supermodulated and from unaltered modulable waveforms;
   (e) counting the supermodulated waveforms occurring in at least a certain part of said redundancy interval of a succession of incoming frames;
   (f) counting the supermodulated waveforms occurring in at least a certain part of said recovery interval of a succession of incoming frames;
   (g) correlating the number of waveforms counted in step (e) with the number thereof counted in step (f) by comparing their ratio with a predetermined critical value indicative of a disalignment between outgoing and incoming frames; and
   (h) upon ascertaining a surpassing of said critical value by said ratio in step (g), temporarily modifying the number of symbol periods of a current incoming frame to reduce such disalignment.

2. A method as defined in claim 1 wherein step (e) includes a separate counting of supermodulated waveforms in a first zone of said redundancy interval close to said recovery interval and in a second zone of said redundancy interval close to the end of the incoming frame, the ratio of the number of waveforms counted in said first zone to the number counted in step (f) being compared with a first critical value, the ratio of the number of waveforms counted in said second zone to the number counted in step (f) being compared with a second critical value, an excess of the first ratio over said first critical value resulting in a lengthening of the next incoming frame, an excess of the second ratio over said second critical value resulting in a shortening of the current incoming frame.

3. A method as defined in claim 1 or 2 wherein, with k>1, a certain bit of said binary word invariably has the logical value "1," the counting of supermodulated waveforms in step (f) being carried out in a part of said recovery interval in which said certain bit is expected to occur.

4. A method as defined in claim 3 wherein, with k>2, the first and the last bit of said binary word invariably have the logical value "1," the counting of supermodulated waveforms in step (f) being carried out upon detection of the first and the $k^{th}$ modulable waveform in each incoming frame.

5. A method as defined in claim 4 wherein step (e) includes a separate counting of supermodulated waveforms in a frame phase immediately following the end of said recovery interval and in a frame phase immediately preceding the beginning of a new incoming frame, with respective lengthening and shortening of the corresponding incoming frame upon the ratio of either count to the number counted in step (f) exceeding an assigned critical value.

6. A system for recovering supplemental message signals at a receiving end of a transmission path from a composite stream of symbols represented by waveforms carrying primary information in the form of amplitude variations among a plurality of levels including two limiting levels and at least one intermediate level, said composite stream being organized at a transmitting end of said path in a recurrent outgoing frame of N symbol periods, said supplemental message signals being coded in a binary word of k bits superimposed in each outgoing frame upon an initial group of k modulable waveforms with amplitudes on at least one of said limiting levels, a modulable waveform carrying a "0" bit of said binary word being unaltered whereas a modulable waveform carrying a "1" bit is supermodulated with an amplitude beyond the limiting level thereof, the number k being substantially less than the number of probable modulable waveforms in a frame,
comprising:
timing means connected to said path for extracting from said composite stream a train of clock pulses at the cadence of said symbol periods;
first counting means of variable cycle length connected to said timing means for establishing an incoming frame normally consisting of N symbol periods;
threshold means connected to said path for emitting a marking pulse on one lead in the presence of any modulable waveform and for emitting a demodulation pulse on another lead in the presence of any supermodulated waveform;
second counting means connected to said one lead for establishing a recovery interval starting with the beginning of each incoming frame and ending with the $k^{th}$ marking pulse generated in each incoming frame, followed by a redundancy interval lasting to the end of the incoming frame, said second counting means being resettable by a start pulse from said first counting means;
output means connected to said other lead and to said second counting means for reconstituting said binary word from said marking and demodulation pulses generated during said recovery interval;
third counting means connected to said other lead and controlled by said first and second counting means for determining the number of demodulation pulses generated in at least a certain part of said redundancy interval;
fourth counting means connected to said other lead and controlled by said second counting means for determining the number of demodulation pulses generated in at least a certain part of said recovery interval; and
circuit means connected to said first, third and fourth counting means for determining the ratio of the counts of said third and fourth counting means and, upon said ratio surpassing a predetermined critical value indicative of a disalignment between outgoing and incoming frames, temporarily modifying the cycle length of said first counting means to reduce such disalignment.

7. A system as defined in claim 6 wherein said fourth counting means comprises at least one cyclic reference counter resetting said third counting means upon reaching a predetermined count.

8. A system as defined in claim 6, further comprising logical circuitry connected to said threshold means and to said first and second counting means for modifying the operation of said third counting means during said redundancy interval to establish a first counting mode yielding a first ratio of counts in a zone of said redundancy interval close to said recovery interval and a second counting mode yielding a second ratio of counts in a zone of said redundancy interval close to the end of the incoming frame, said circuit means adjusting the cycle length of said first counting means to a number of symbol periods greater than N in response to said first ratio exceeding a first critical value and to a number of symbol periods smaller than N in response to said second ratio exceeding a second critical value.

9. A system as defined in claim 8 wherein said third counting means comprises a plurality of mutually independent error counters activated at different times by said logical circuitry and resettable by respective cyclic reference counters, forming part of said fourth counting means, upon the attainment of respective counts of demodulation pulses generated during said recovery interval.

10. A system as defined in claim 9 wherein at least one of said error counters is an up/down counter activated by said logical circuitry for forward counting in one zone and backward counting in another zone of said redundancy interval.

11. A system as defined in claim 6, 7, 8, 9 or 10 wherein, with k>2, the first and the last bit of said binary word invariably have a logical value "1," said fourth counting means being activated by said second counting means only in a fist and a $k^{th}$ counting phase thereof.

12. A system as defined in claim 11 wherein said third counting means includes an up/down counter with input means for stepping same forward in response to a demodulation pulse coinciding with a $(k+1)^{th}$ marking pulse and stepping same backward in response to a demodulation pulse coinciding with a final marking pulse of an incoming frame.

* * * * *